United States Patent
Mejia Caballero et al.

(10) Patent No.: US 10,196,009 B2
(45) Date of Patent: Feb. 5, 2019

(54) COVER FOR A SWITCH

(71) Applicant: FORD GLOBAL TECHNOLOGIES, LLC, Dearborn, MI (US)

(72) Inventors: Eduardo Daniel Mejia Caballero, Mexico (MX); Omar Antonio Ramirez Pavon, Portales Norte (MX); JoséRafael Reyes Guerra, Naucalpan de Juarez (MX); José Luis Hernández Guzmán, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 15/345,743

(22) Filed: Nov. 8, 2016

(65) Prior Publication Data

US 2018/0126923 A1    May 10, 2018

(51) Int. Cl.
*H01H 9/02* (2006.01)
*B60R 13/01* (2006.01)
(Continued)

(52) U.S. Cl.
CPC .............. *B60R 13/013* (2013.01); *B60N 2/04* (2013.01); *B60N 2/3075* (2013.01); *B60N 2/36* (2013.01); *B60N 2/58* (2013.01); *B60N 2/688* (2013.01); *H01H 9/02* (2013.01); *H01H 2300/008* (2013.01)

(58) Field of Classification Search
CPC   H01H 1/36; H01H 15/06; H01H 1/44; H01H 13/14; H01H 13/705; H01H 2221/044; H01H 9/02; H01H 2/04; H01H 2/36; H01H 2/58; H01H 2/688
USPC .... 200/531, 530, 61.76, 252, 536, 341–345, 200/293–297, 281, 4
See application file for complete search history.

(56) References Cited

U.S. PATENT DOCUMENTS 4,119,823 A   10/1978   Matsueda et al.
5,008,505 A    4/1991   Takano et al.
(Continued)

FOREIGN PATENT DOCUMENTS

CN   202003900 U   10/2011
CN   203026410 U    6/2013
DE     4321981 A1    1/1995

OTHER PUBLICATIONS

English Machine Translation of CN202003900U.
English Machine Translation of CN203026410U.
English Machine Translation of DE4321981A1.

*Primary Examiner* — Ahmed Saeed
(74) *Attorney, Agent, or Firm* — Vichit Chea; King & Schickli, PLLC

(57) ABSTRACT

A cover for a switch includes a body having a thru-hole for receiving the switch. Retainers supported by the body each have a groove facing the thru-hole and guide surfaces extending upward from an edge of a bottom surface of the retainers to a lower edge of the groove. The outer surface may be contoured and the contoured outer surface may be oblong. The cover may be used in a switch assembly for a vehicle. The switch has a base extending from a surface of the vehicle and first and second flexible members extending outwardly from the base in a normal position. The guide surfaces deflect the flexible members from a normal position during installation of the cover. The flexible member returns to the normal position when the cover is placed such that an upper portion of the flexible member is retained within the groove.

17 Claims, 7 Drawing Sheets

(51) Int. Cl.
- *B60N 2/04* (2006.01)
- *B60N 2/30* (2006.01)
- *B60N 2/36* (2006.01)
- *B60N 2/58* (2006.01)
- *B60N 2/68* (2006.01)

(56) References Cited

U.S. PATENT DOCUMENTS

| | | |
|---|---|---|
| 5,990,431 A | 11/1999 | Wright |
| 6,166,339 A | 12/2000 | Bechis |
| 7,145,091 B1 | 12/2006 | Wang |

COVER FOR A SWITCH

TECHNICAL FIELD

This document relates generally to switches, and more specifically to a cover for a switch.

BACKGROUND

Vehicles that require access to second and third seat rows typically utilize a dump switch to collapse a back of a seat forward to accommodate ingress to and egress from the rearward seat row. In two door vehicles, the dump switch is typically positioned on a seat in the front seat row while in mini-vans, SUVs and crossover vehicle, the dump switch is typically positioned on a seat in the second seat row with access through a rear side or a sliding side door to a third seat row.

Regardless of vehicle type, the dump switch is typically positioned either on an upper or lower corner of the seat back adjacent the door. This provides common access for passengers seated in the row behind the seat or passengers looking to enter the vehicle. Given the prominent placement of such switches, the switch needs to have an aesthetic appearance that corresponds to the overall appearance of the vehicle interior. Even more, in light of the placement of such switches, the switch needs to include a cover that minimizes inadvertent user manipulation.

Accordingly, a need exists for a cover that minimizes inadvertent user manipulation of the switch and should not detract from the aesthetic appearance of the vehicle interior.

SUMMARY OF THE INVENTION

In accordance with the purposes and benefits described herein, a cover for a switch is provided. The cover may be broadly described as including a body having a thru-hole for receiving the switch, and retainers supported by the body. The retainers each have a groove facing the thru-hole and a guide surface extends upward from an edge of a bottom surface of the retainers to a lower edge of the groove. In one possible embodiment, the retainers are integrally formed.

In another possible embodiment, each of the guide surfaces is arcuate. In another, each of the guide surfaces include at least two segments.

In yet another possible embodiment, the retainers are positioned on opposing sides of the thru-hole.

In still yet another possible embodiment, the outer surface is contoured. In another, the contoured outer surface is oblong.

In one additional possible embodiment, the retainers includes first and second side walls extending from the bottom surface to a top surface, and wherein the top surface extends beyond the side walls. In another, the grooves extends from the first side wall to the second side wall.

In accordance with another possible embodiment, a cover for a switch includes a contoured body having a thru-hole for receiving the switch, and first and second retainers supported by the body. Each of the first and second retainers includes a top surface, a bottom surface, first and second side walls, a groove facing the thru-hole, and a guide surface extending inward from the bottom surface to a lower edge of the groove.

In another possible embodiment, the guide surface of the first retainer and the second retainer includes at least two segments. In another, the at least two segments are flat and the at least two segments form an arcuate shape. In still another, an uppermost of the at least two segments is substantially perpendicular to the bottom surface.

In accordance with another possible embodiment, a switch assembly for a vehicle includes a switch having a base extending from a surface of the vehicle, first and second flexible members extending outwardly from the base in a normal position, and a cover. The cover includes a body having a hole through which the switch extends, and first and second retainers supported by the body. The first and second retainers each include a groove facing the hole and a guide surface extending upward toward the base from a bottom surface of the body for deflecting one of the first and second flexible members from the normal position toward the base to a deflected position during placement of the cover such that the one of the first and second flexible members returns to the normal position when the cover is placed such that an upper portion of the flexible member is retained within the groove.

In one other possible embodiment, a bottom surface of the cover is contoured to match the surface of the vehicle. In another, the cover is oblong.

In still another possible embodiment, each of the guide surfaces is arcuate. In another, each of the guide surfaces include at least two segments.

In still another possible embodiment, the first retainer is positioned opposite the second retainer.

In yet still another possible embodiment, each of the first and second retainers includes first and second side walls extending from the bottom surface to a top surface, and wherein the groove extends from the first side wall to the second side wall.

In the following description, there are shown and described several embodiments of a cover and switch assembly for a vehicle incorporating same. As it should be realized, the cover and switch assembly are capable of other, different embodiments and their several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cover and switch assembly for a vehicle and together with the description serve to explain certain principles thereof. In the drawing figures.

Reference will now be made in detail to the present preferred embodiments of the cover and switch assembly, examples of which are illustrated in the accompanying drawing figures, wherein like numerals are used to represent like elements.

DETAILED DESCRIPTION

Figure 1:
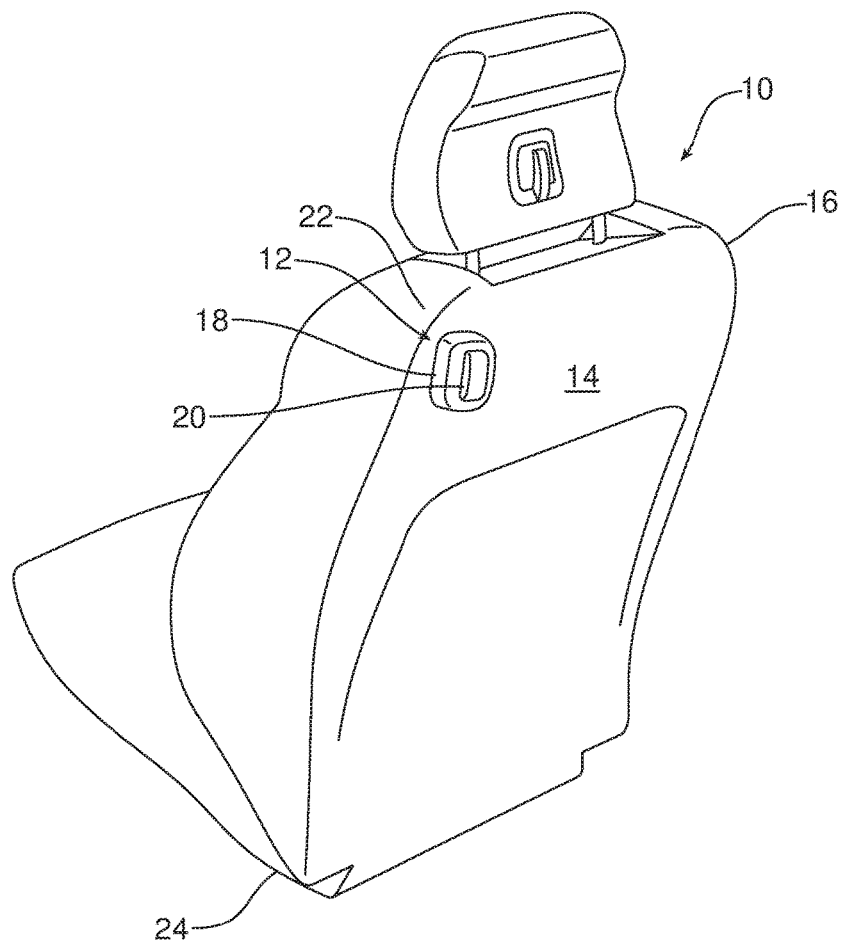
FIG. 1 is a partial perspective view of a vehicle seat having a switch assembly mounted thereto.

Reference is now made to FIG. 1 which illustrates a typical vehicle seat 10 having a switch assembly 12 positioned on a rear surface 14 of a back 16 of the seat. The switch assembly 12 includes a cover 18 and a switch 20. In the described embodiment, the switch 20 is a dump switch for collapsing the back 16 of the seat 10 to a forward, or collapsed, position. In this position, ingress to and egress from a rearward seat row (not shown) is accommodated. The vehicle seat 10 may be in a front row seat, a second row seat, or a third row seat depending upon the particular vehicle and/or vehicle type.

Regardless of vehicle type, the dump switch 20 is typically positioned on an upper corner 22 or lower corner 24 of the seat back 16 adjacent a door (not shown) of the vehicle. As shown, the dump switch 20 in the described embodiment is positioned in the upper corner 22. This provides common access for passengers seated in the row behind the seat 10 or passengers looking to enter the vehicle.

Figure 2:
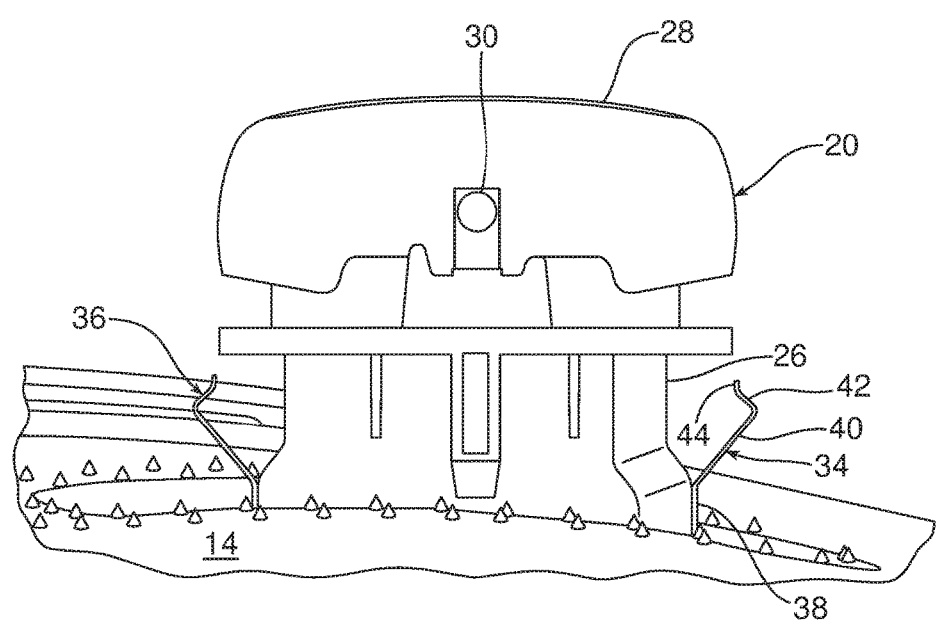
FIG. 2 is a perspective view of a switch mounted to a surface of the vehicle seat.

As shown in FIG. 2, the switch 20 includes a base 26 extending from the rear surface 14 of the seat 10. In other embodiments, the surface from which the switch extends could be any surface whether in a vehicle or otherwise. In the described embodiment, the switch 20 is a rocker switch having a rocker 28 in pivoting engagement with a fulcrum 30 supported along an upper portion 32 of the switch. First and second flexible members 34, 36 extend from the base 26 of the switch 20.

Figure 4:
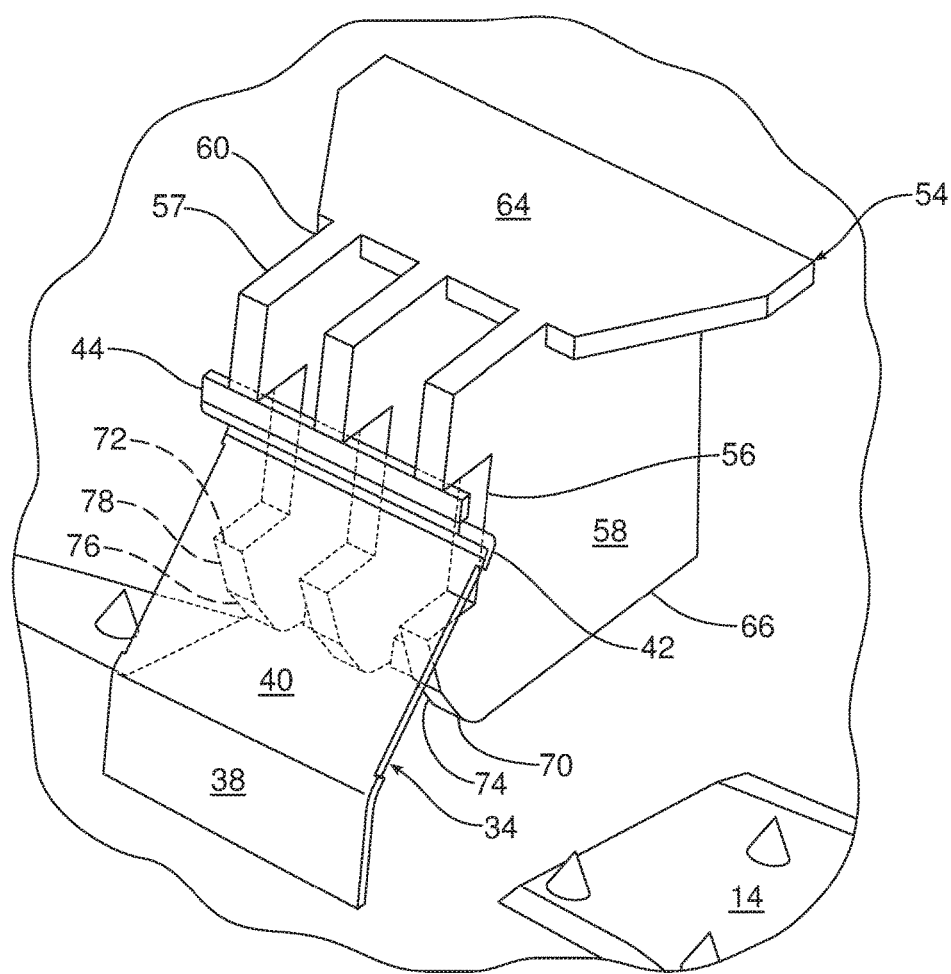
FIG. 4 is a perspective view of a retainer of a cover of the switch assembly engaged with a flexible member of the switch.

As perhaps best shown in FIG. 4, the flexible members 34, 36 are generally flat, plastic pieces having a first segment 38 extending substantially perpendicular to the base 26, a second segment 40 extending upwardly and away from the base, a third segment 42 that essentially curves upwardly and turns back toward the base, and a fourth segment 44 that extends substantially perpendicular to the base in a first or normal position. In the described embodiment, the flexible members 34, 36 extend in opposite directions.

Figure 3:
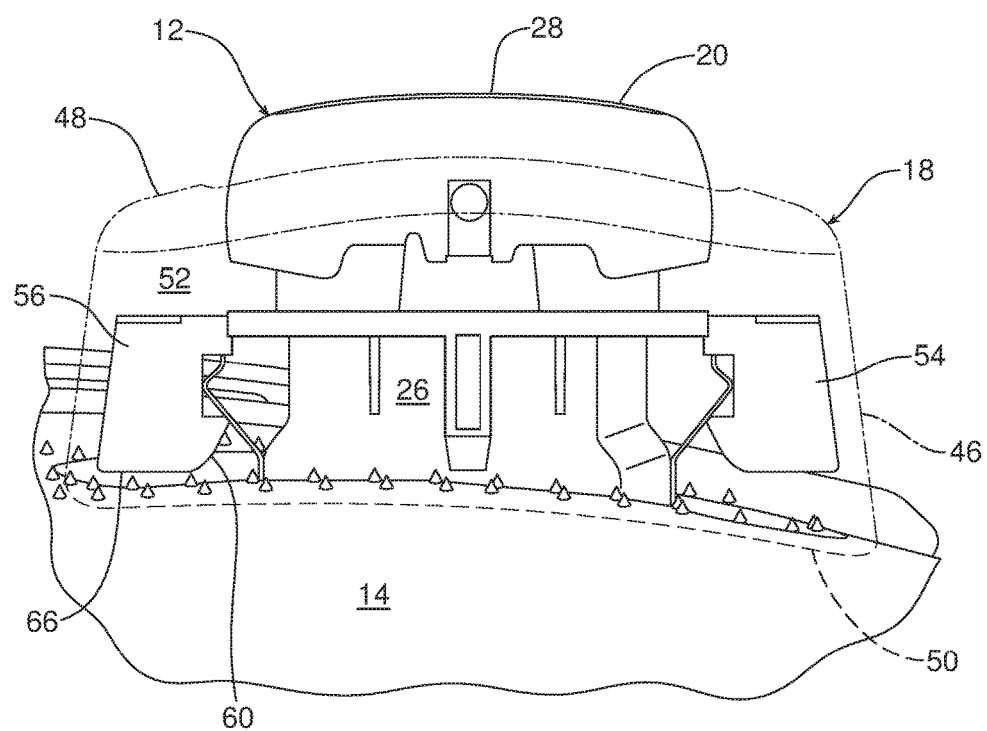
FIG. 3 is a perspective view of a switch assembly mounted to the surface of the vehicle seat.

A completed switch assembly 12 is shown in FIG. 3 with the cover 18 shown in phantom. As shown, the cover 18 includes a body 46 having a thru-hole for receiving the switch 20 during assembly. The body 46 may be a molded plastic or similar material with the thru-hole formed during the molding process. Of course, the thru-hole may be bored after molding in alternate embodiments. Once the switch assembly 12 is assembled, the switch base 26 is hidden by the cover 18 and at least a portion of the rocker 28 extends above an upper surface 48 of the cover. This allows users of the switch 20 to contact the rocker 28, in the described embodiment, or push button or other actuator in alternate embodiments, for actuating the switch.

As shown, a bottom surface 50 of the body 46 is contoured to match the surface 14 of the seat 10. An outer surface 52 of the body 46 is also contoured for tactile and aesthetic reasons. More specifically, the contoured outer surface 52 at least provides smooth transitions between the seat surface 14 and the body 46 and the body and the upper surface 48 and rocker 28. Of course the contoured surfaces 50 and 52 of the described embodiment may vary in alternate embodiments depending upon the surface from which the switch extends and the type of switch and actuator.

The cover further includes first and second retainers 54, 56 supported by the body 46. In the described embodiment, the first and second retainers 54, 56 are separately formed and attached to the body 46 of the cover 18. Alternately, the retainers may be integrally formed with the cover. The first and second retainers 54, 56 are positioned on opposing sides of the thru-hole and switch base 26 and act to secure the cover 18 in position over the switch 20 utilizing the first and second flexible members 34, 36.

In the described embodiment, the first and second retainers 54, 56 are essentially the same and face one another inside of the cover 18. Accordingly, only the first retainer 54 will be described in detail. As shown in FIG. 4, the first retainer 54 includes a groove 56 partially defined by a plurality of ribs 47 that faces the thru-hole. The groove 56 extends from a first side wall 58 to a second side wall 60 in the described embodiment but could extend along only a portion of the retainer 54 in other embodiments. The retainer 54 further includes a top surface 64, a bottom surface 66, and a guide surface 68. As shown, the guide surface 68 includes a portion of each of the three ribs 57 in the described embodiment.

The guide surface 68 extends inward from the bottom surface 66, or an edge 70 of the bottom surface, to a lower edge 72 of the groove 56 in the described embodiment. In other words, the guide surface 68 extends upward toward the base 26 from the bottom surface 66 of the body 46. As shown, the guide surface 68 in the described embodiment is formed by three flat segments on each of the three ribs 57. A first segment 74 extends upward from the bottom surface 66 toward the base 26, a second segment 76 extends upward at a steeper angle than the first segment, and a third segment 78 extends substantially perpendicular to the base terminating at the lower edge 72 of the groove 56. Together, these segments form a guide surface 68 having an arcuate shape. Of course other embodiments, may include more or fewer segments or may include a smooth or partially smooth arcuate shape. While the actual shape of the guide surface 68 may take many forms, the purpose of the surface remains the same, i.e., to guide or deflect the flexible member 34 during placement of the cover 18 onto the switch 20.

Figure 5A:
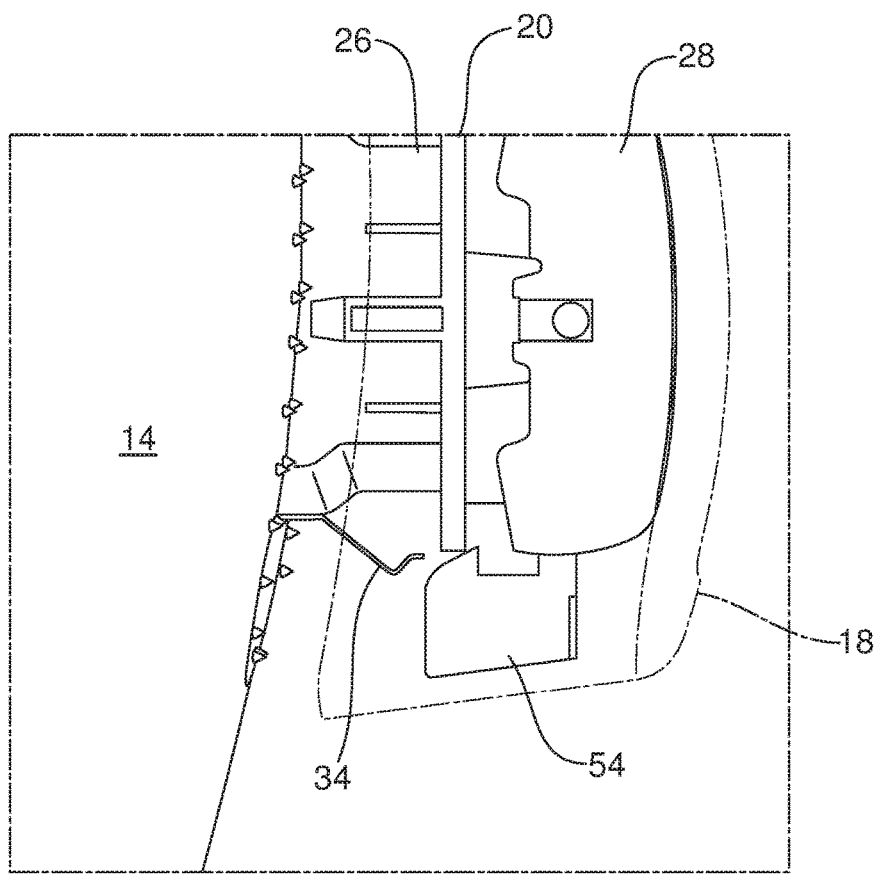
FIG. 5A is a cross sectional plan view of the switch mounted to the surface of the vehicle seat receiving the cover during assembly showing the flexible member in a normal position.
Figure 5B:
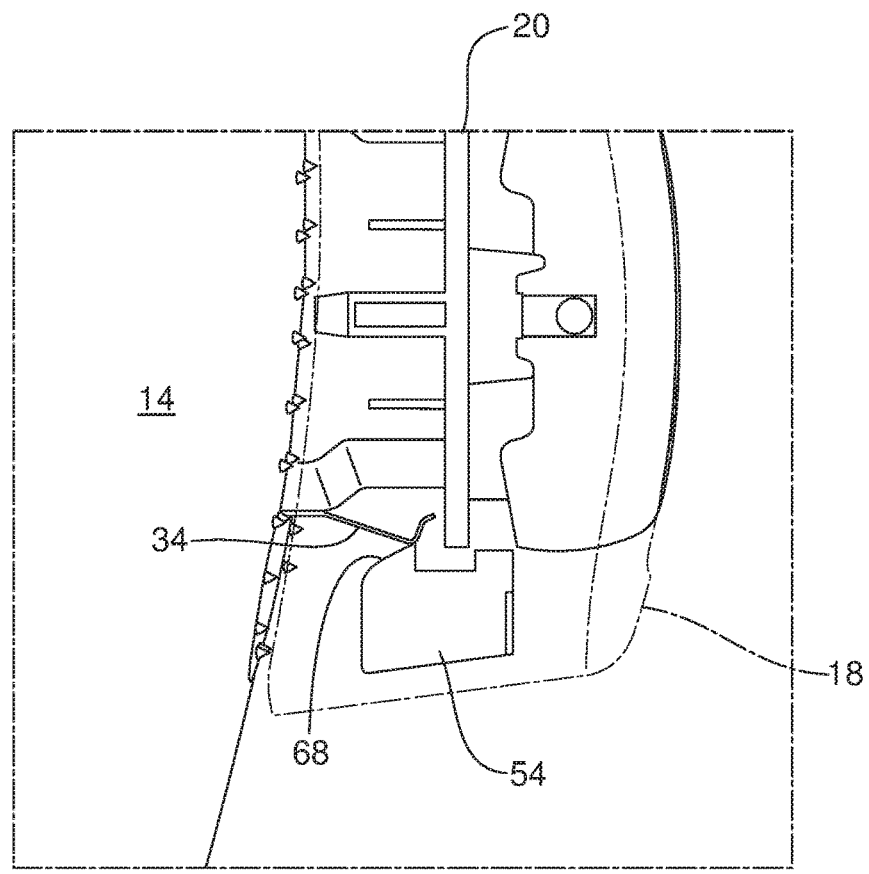
FIG. 5B is a cross sectional plan view of the switch mounted to the surface of the vehicle seat receiving the cover during assembly showing the flexible member in a deflected position.
Figure 5C:
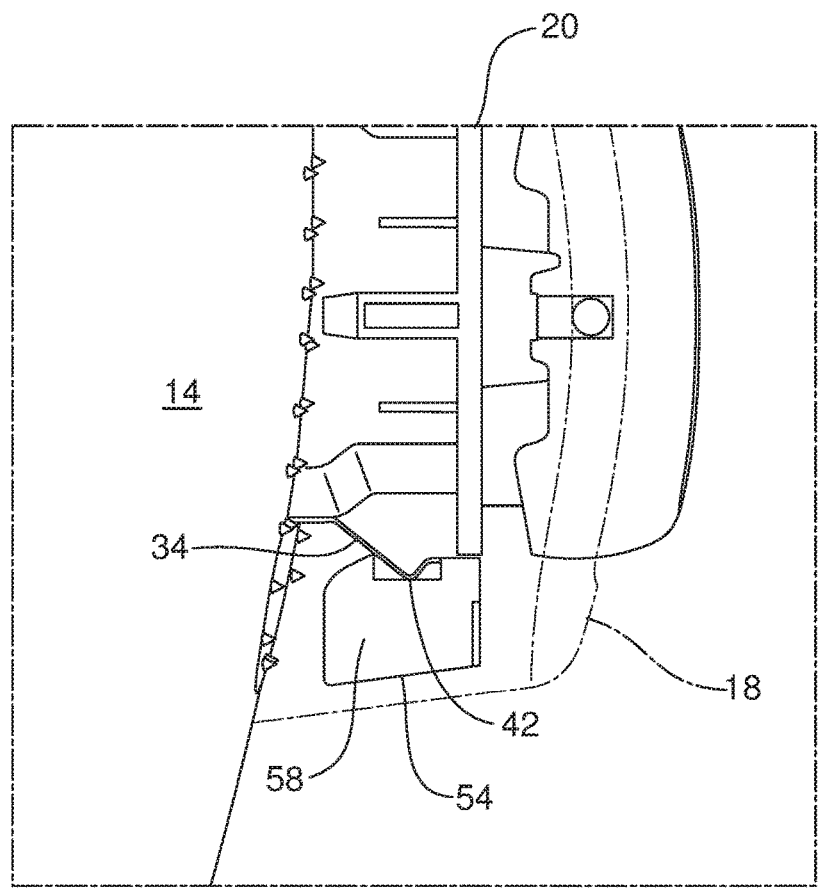
FIG. 5C is a cross sectional plan view of the switch mounted to the surface of the vehicle seat showing the flexible member locked in position within a groove in the retainer as assembled.

As shown in FIGS. 5A-5C, the switch 20 is attached to the seat 10 prior to placement of the cover 18. As shown in FIG. 5A, the cover 18 is positioned over the switch 20 such that the rocker 28 and a portion of the base 26 are received inside the cover. As the cover 18 descends toward the rear surface 14, the guide surfaces 68 of the first retainer 54 and the second retainer 56 contacts the first flexible member 34 and the second flexible member 36 deflecting them from their normal positions as shown in FIG. 5B. The normal position is the position of the flexible member in a natural or unbiased position.

The flexible members 34, 36 continue to be deflected toward the base 26 to a deflected position as the cover 18 continues to descend toward the rear surface 14. In the described embodiment, a maximum deflected position is reached when the third segment 42 is adjacent the lower edge 72 of the groove 58. Once the cover 18 descends past this point, the guide surface 68 contacts the second segment 40 of the flexible members 34, 36 allowing the flexible members to return to the normal position. In this position, the flexible members 34, 36 are partially positioned within the groove 58 and the fourth segment 44 of the flexible members is adjacent an upper edge of the groove as shown in FIG. 5C. In this position, the cover 18 is essentially locked in position partially encompassing at least a portion of the switch 20.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A switch assembly for a vehicle, comprising:
a switch having a base extending from a surface of the vehicle;
first and second flexible members extending outwardly from said base in a normal position; and
a cover including a body having a hole through which said switch extends, and first and second retainers supported by said body, said first and second retainers each include a groove facing the hole and a guide surface extending upward toward said base from a bottom surface of the first or second retainer for deflecting one of said first and second flexible members from the normal position toward said base to a deflected position during placement of said cover, and wherein said one of said first and second flexible members returns to the normal position when said cover is placed such that an upper portion of said flexible member is retained within said groove.

2. The switch assembly for a vehicle of claim 1, wherein a bottom surface of said cover is contoured to match the surface of the vehicle.

3. The switch assembly for a vehicle of claim 2, wherein said cover is oblong.

4. The switch assembly for a vehicle of claim 1, wherein each of said guide surfaces is arcuate.

5. The switch assembly for a vehicle of claim 1, wherein each of said guide surfaces include at least two segments.

6. The switch assembly for a vehicle of claim 1, wherein said first retainer is positioned opposite said second retainer.

7. The switch assembly for a vehicle of claim 6, wherein each of said first and second retainers includes first and second side walls extending from said bottom surface to a top surface, and wherein said groove extends from said first side wall to said second side wall.

8. The switch assembly for a vehicle of claim 1, wherein the guide surface extends from the bottom surface of the retainer to a lower edge of the groove.

9. The switch assembly for a vehicle of claim 1, wherein the guide surface extends from an edge of the bottom surface of the retainer to a lower edge of the groove.

10. The switch assembly for a vehicle of claim 1, wherein the retainers are integrally formed.

11. The switch assembly for a vehicle of claim 1, wherein the guide surfaces form an arcuate shape.

12. The switch assembly for a vehicle of claim 1, wherein each of the guide surfaces include at least two segments.

13. The switch assembly for a vehicle of claim 12, wherein an uppermost of said at least two segments is substantially perpendicular to said bottom surface.

14. The switch assembly for a vehicle of claim 1, wherein each of said first and second retainers includes first and second side walls extending from the bottom surface to a top surface that extends beyond the side walls.

15. The cover of claim 1, wherein each of the grooves extends from the first side wall to the second side wall.

16. The cover of claim 1, wherein the groove is partially defined by a plurality of ribs.

17. The cover of claim 16, wherein the guide surface is formed by three flat segments on each of the plurality of ribs.

* * * * *